3,297,408
PROCESS FOR PRODUCTION OF HYDROGEN
Walton H. Marshall, Jr., Laurel Grove,
Downings, Va. 22452
Filed Apr. 5, 1965, Ser. No. 446,790
7 Claims. (Cl. 23—212)

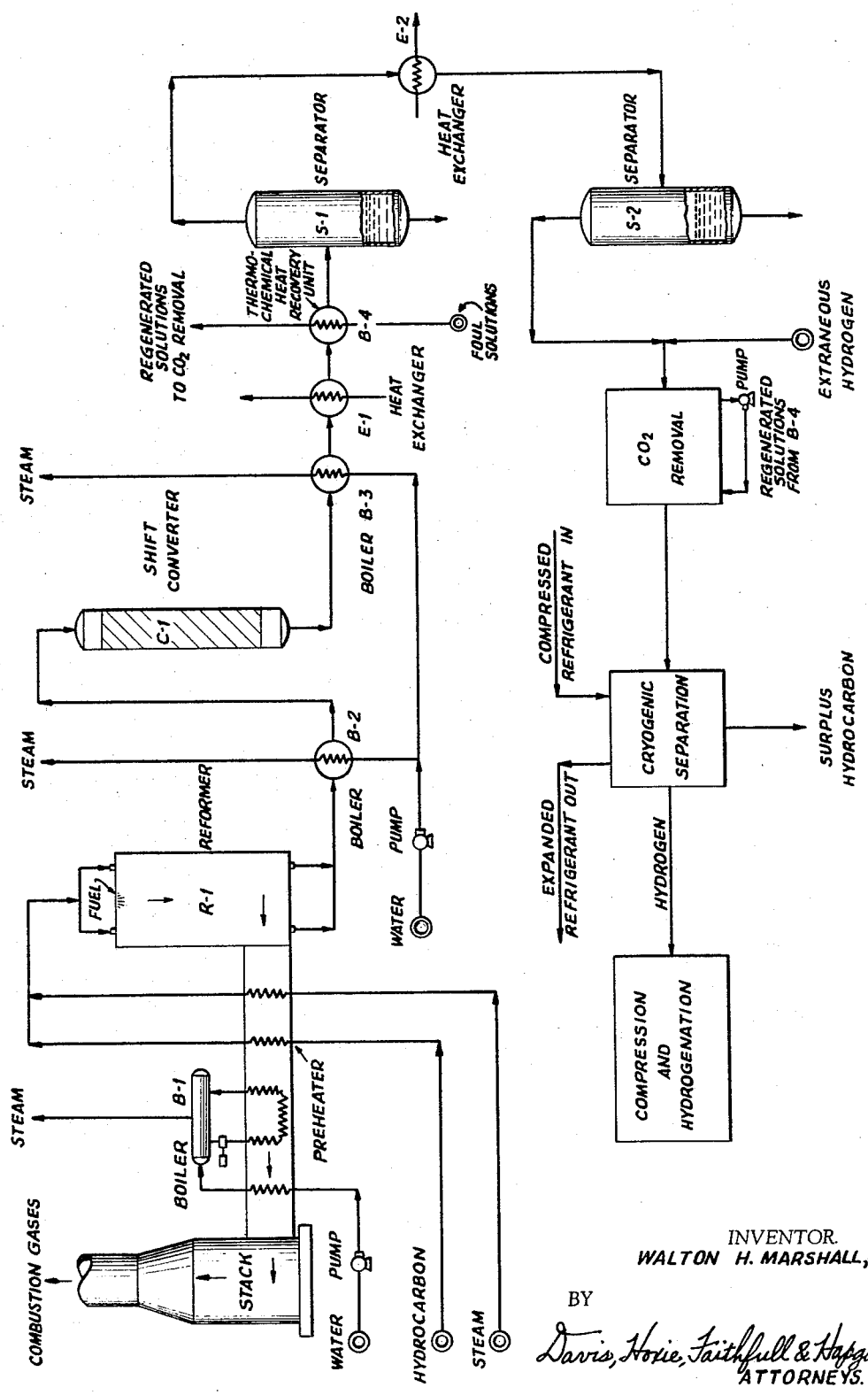

This application is a continuation-in-part of my copending United States patent application Serial No. 176,362 filed February 28, 1962 and now abandoned.

This invention is an improved process for the production of industrial hydrogen by the catalytic reforming of hydrocarbons with steam.

The conventional process for the production of industrial hydrogen consists of (a) catalytic reforming of hydrocarbons with steam at pressures in the range of 100 p.s.i.g. to 150 p.s.i.g., (b) shift conversion of the product from primary reforming to convert most of the carbon monoxide to carbon dioxide, (c) removal of $CO_2$ from the crude hydrogen and (d) removal of CO from the hydrogen by methanation or copper liquid absorption when the hydrogenation operation is sensitive to the presence of carbon monoxide. In the reforming step in this conventional process in excess of about 90% of the hydrocarbons are converted to hydrogen.

My improved process for the production of hydrogen consists of the catalytic conversion of hydrocarbons, such as methane, pentane or heavier, with steam at unusually high pressures, in the range of about 300 p.s.i.a. to about 700 p.s.i.a. and preferably in the range of 350 p.s.i.a. to 600 p.s.i.a. giving an unusually low conversion of the hydrocarbons, in the range of about 50% to about 85% and preferably in the range of 60% to 75% and thereby producing hydrogen of unusually low quality, containing as much as 7.5% to 14% of unconverted hydrocarbon when operating within the preferred conversion range. In order to make this low quality hydrogen satisfactory for industrial usage, my process utilizes a step in the process sequence which has been hitherto unnecessary. This step is a cryogenic separation between hydrogen and hydrocarbon whereby the hydrogen concentration is preferably increased to the range of 97.5% to 99%. I have found unexpectedly that such partial conversion of the hydrocarbon feed combined with a cryogenic separation gives substantial economic benefits over the conventional process of producing hydrogen.

In the accompanying figure, the single illustration is a flowsheet showing schematically a typical way of carrying out my improved process. Briefly, it is carried out as follows. At R-1 in the figure the hydrocarbon feed is catalytically reformed with steam, and at C-1 the product from R-1 is treated to convert to carbon dioxide most of the carbon monoxide produced in the reformer. After condensation of the steam in the product from C-1, the condensate is separated at S-1 and S-2 and carbon dioxide is removed. The removal of carbon monoxide, which may, if desired, be accomplished by any of the known means, is not shown. The surplus hydrocarbon is cryogenically separated in a known manner from the crude hydrogen gas, as shown schematically. Further details of my improved process are included in the example which is set forth later.

A large number of hydrogen plants have been built throughout the world which employ the basic step of catalytic reforming of hydrocarbons with steam at elevated temperatures. Most are operated under conditions to give a very high conversion of hydrocarbons in the reforming step, in excess of 90%, and a concomitant maximum production of hydrogen, since the presence of inert gases, such as methane, admixed with the hydrogen impairs its efficient use. For example, in a hydrogenation operation, such as high pressure hydrogenation of carbonaceous materials, the presence of an inert gas, such as methane, with hydrogen will seriously impair the efficiency of operation. In many hydrogenation operations it is customary to maintain a concentration of about 90% hydrogen in the gaseous phase. Under these circumstances the purging of a single volume of inert hydrocarbon introduced by the feed gas requires the simultaneous purging and loss from the system of nine volumes of hydrogen, since each mole of methane purged carries with it nine moles of hydrogen.

It is well known that the reforming of hydrocarbons at elevated pressure offers certain economic advantages, since gas compression requirements are reduced and higher heat recoveries are obtained. On the other hand, it is also well known that the use of high pressure retards the conversion of hydrocarbon. For example, the dominant reaction usually can be expressed as

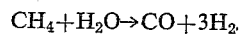

$$CH_4 + H_2O \rightarrow CO + 3H_2.$$

In accordance with this equation, the mass action effects are such that the retardation of the reaction is proportional to the square of the absolute pressure in the system. Consequently the design of a hydrogen plant is a compromise between the specific benefits of higher pressures on the one hand and the corresponding detriment of lower hydrocarbon conversion on the other. In current industrial practice hydrogen is generated at about 125 p.s.i.g. or lower and conversion of hydrocarbon is approximately 90% or higher. This results in the direct production, after raw hydrogen purification and methanation of carbon monoxide, of hydrogen having a purity of 96% or higher. In some ammonia synthesis gas plants higher pressures have been used, as is well known, but in that process the introduction of air into a secondary reforming step produces a temperature rise which counterbalances the retarding effect of pressure. My improved process is therefore limited to a single-stage catalytic reforming of hydrocarbons with steam as the principal reforming agent, but which may contain minor amounts of other carriers of oxygen such as carbon dioxide. It does not have general application in the production of hydrogen containing gases where, as in the production of ammonia synthesis gas, there are other countervailing considerations.

I have found contrary to expectations that a superior process of catalytic steam reforming of hydrocarbons results if (1) the reforming process is conducted at unusually high pressure levels of about 300 p.s.i.a. to about 700 p.s.i.a. and preferably between 350 p.s.i.a. and 600 p.s.i.a., and at unusually low conversions of about 50% to about 85% and preferably between 60% and 75%, and (2) there is introduced into the process sequence a cryogenic step for the separation of hydrogen and hydrocarbon. As is well known, these cryogenic operations are costly, requiring special materials for operating at temperatures below −200° F., and require the use of external refrigeration in order to effect the desired separation. Nevertheless, in spite of this disadvantage, my improved process has substantial economic advantage over prior methods. I have further found that my low conversion method is not advantageous throughout the entire possible range of conversion, but only within a range of process conditions which are hereinafter more fully set forth.

The following example further illustrates my improved process and sets forth preferred conditions for its use.

EXAMPLE

Referring to the figure, the main, radiant section of the reformer R-1 (shown schematically in the figure) contains catalyst-filled tubes through which the reactants are passed. Fuel is fired outside such tubes and provides heat for this section of the reformer R-1. The combustion gases from the fuel pass through the reformer preheater section and furnish heat to preheat the hydrocarbon and steam (as shown) as well as to develop steam in waste heat boiler B-1. Thereafter, the combustion gases exit through the stack as shown. A hydrocarbon or mixture of hydrocarbons and steam are preheated in the preheater to a temperature of approximately 750° F. and the hydrocarbon and steam mixture is passed to the catalyst-filled tubes in the main radiant section of reformer R-1. Pressure at the entrance to the reformer R-1 is 500 p.s.i.g. (515 p.s.i.a. and the steam-to-carbon ratio (ratio of atoms of oxygen in the steam to atoms of carbon in the hydrocarbon) in the feed mixture is adjusted to 4.0. At the outlet temperature of 1480° F. from R-1 approximately 65% of the carbon contained in the entering feed is converted by the steam to oxides of carbon. The remaining carbonaceous material is largely methane, although there may be small amounts of heavier hydrocarbons if introduced in the feed. Boiler B-1 is the customary waste heat boiler where water is heat exchanged with the combustion gases from primary reforming to produce surplus steam.

The effluent from reformer R-1 is cooled in boiler B-2 to approximately 700° F. and is conducted to shift converter C-1 where most of the carbon monoxide is converted by reaction with steam to carbon dioxide with the production of more hydrogen. Water evaporated in B-2 can come from any convenient source, and it is especially advantageous here to use contaminated process condensate, produced after shift conversion, and to recycle the contaminated steam back into the reformer furnace R-1, as hereinafter more fully set forth.

A number of variations in the shift conversion step, such as the use of two or more different catalysts at different temperature levels, may be used in practicing my improved process. Further heat is recovered from the effluent stream from C-1 as indicated at boiler B-3 and heat exchanger E-1, and the process stream then goes to the hot side of B-4 where surplus steam condensing provides the energy to regenerate in a known manner the foul purification solutions, such as aqueous monoethanolamine and potassium carbonate, used to remove carbon dioxide from the hydrogen.

Hot condensate is separated at about 260° F. in separator S-1 and the process stream is cooled in E-2 to approximately ambient temperature, practically all of the remaining water vapor being condensed. After removal of cold process condensate in S-2 the crude hydrogen goes to the step of $CO_2$ removal where carbon dioxide is removed in a known manner. The hydrocarbon content of the hydrogen after $CO_2$ removal is unusually high, approximately 12% as compared with a value of 2%–3% or less in a conventional operation. It is, therefore, largely unsuitable for hydrogenation usage.

In order to remove inert hydrocarbons, the partially purified gas is sent to a cryogenic step where hydrogen and hydrocarbon are separated from each other in a known manner at around —270° F. to —290° F. The cryogenic separation requires the use of outside power, indicated in the figure as compressed and expanded refrigerant. The industrial hydrogen gas from cryogenic separation at about —280° F. contains about 98.5% hydrogen and is now suitable for hydrogenation process. Hydrocarbon separated from the hydrogen is withdrawn from the cryogenic unit at relatively low pressure.

A supplementary advantage of my improved process is that the cryogenic unit is capable of separating carbon monoxide and reducing its content in the hydrogen produced to 100 parts per million or less, thus eliminating the necessity for a methanation step in hydrogenation processes where the catalyst is sensitive to carbon monoxide.

Another advantage of my improved process is that it lends itself to the simultaneous processing of extraneous low-purity hydrogen streams or to the reconcentration of purge gas or recycle gas from the hydrogenation unit. The figure shows these gases entering the $CO_2$ removal unit for purification from acidic constituents, such as $CO_2$ or $H_2S$, but if sufficiently pure they can also be introduced directly into the cryogenic step. The introduction of extraneous hydrogen streams may broaden the temperature range within which condensation of hydrocarbons may occur, since ethane, propane and butane contained therein, for example, have lower vapor pressures and different freezing points than methane. Generally speaking, however, most of the condensation of hydrocarbons will occur between about —200° F. and about —310° F. This is the temperature range intended when the term cryogenic purification is used in this specification.

Based on my calculations, I have found that operation of my improved process within the range of conditions herein set forth has substantial economic advantages over a conventional plant reforming at 125 p.s.i.g. (140 p.s.i.g.).

For a plant to produce 12,000,000 standard cubic feet per day of industrial hydrogen the use of cryogenic purification adds an additional requirement of approximately 500 horsepower for refrigerant compression and approximately one million dollars to capital cost in the form of cryogenic process equipment. However, my improved process reduces hydrogen compression requirements and permits enough by-product steam to be produced in the reformer waste heat boiler to drive all the plant compressors. For example, in a 12,000,000 standard cubic feet per day hydrogen plant, use of my improved process and a reforming pressure of 500 p.s.i.g. reduces hydrogen compression requirements by about 1200 horsepower over that required where reforming is at 125 p.s.i.g. This is a net gain of 700 horsepower after reduction of the amount of 500 horsepower required for cryogenic purification. In addition, in such a plant, use of my process and a reforming pressure of 500 p.s.i.g. permits enough by-product steam to be produced from the primary reformer waste heat boiler to drive the plant compressors, even though the ultimate hydrogen usage is for a high pressure hydrogenation at 3,000 p.s.i.g. or above. In the same size plant when reforming is done in the conventional manner at 125 p.s.i.g. and at high conversion, there is a net deficit in steam supply, and all compression energy must come from an outside source.

Further, my improved process has the following advantages over a conventional process in that my process (a) requires about 50% less purge from the hydrogenation unit, (b) produces hydrogen with less than 100 parts per million of carbon monoxide and (c) permits the reconcentration of hydrogen from the purge gas and the use of low-purity extraneous hydrogen as part of the hydrogen supply to the hydrogenation plant.

To realize the benefits of my improved process the following operating conditions should be maintained.

(1) Conversion of hydrocarbons to hydrogen and oxides of carbon in the reforming step should be maintained between about 50% and about 85%, and preferably between 60% and 75%. When the conversion goes below about 50%, too much low pressure hydrocarbon gas is produced in the cryogenic step, and the necessity for recompressing and recycling of this low pressure gas removes most of the advantages of my process. In the preferred range the low pressure hydrocarbon gas produced in the cryogenic step approximately equals or is less than the fuel requirement in the reforming step, and consequently the necessity for gas recompression is largely eliminated since the gas so produced at low pressure can be used as fuel for firing the former furnace. When the conversion exceeds about 85%, reforming pressure must be reduced to the point where the savings no longer justify the added expense of the cryogenic step.

(2) Pressure in the reforming step should be maintained between about 300 p.s.i.a. and about 700 p.s.i.a. and preferably between 350 p.s.i.a. and 600 p.s.i.a. These pressure limitations are determined by the chemical thermodynamics of hydrocarbon conversion and relate in a complicated manner with the conversion limitations specified above and the steam-to-carbon limitations described below.

(3) The atomic ratio of steam to carbon in the reforming step should be maintained between about 3.0 and about 7.0, and preferably between 3.5 and 6.0. These limits are determined by the equilibrium relationships existing at the reformer outlet when operating within the specified range of conversion and pressure.

(4) Temperatures in the cryogenic step should be controlled so as to lower the hydrocarbon content of the effluent hydrogen from this step to between about 0.5% and about 4%, and preferably to between 1% and 2.5%. When the hydrogen purity is made to exceed about 99.5%, design of the cryogenic system becomes too complicated and equipment too costly for industrial hydrogen purposes. Below 96% purity there is little advantage over current methods of hydrogen production at high conversion, since purge from the hydrogenation unit is not reduced. Within the preferred range of 99% to 97.5% hydrogen the cryogenic equipment is relatively simple, using a nitrogen cycle for makeup refrigeration. Within this range the purge losses from hydrogenation are also moderate.

Under certain circumstances, where high pressure hydrogenation is involved, it may be advisable to go through a stage of compression before the cryogenic step. In this circumstance the process pressure in cryogenic separation may be 650 p.s.i.a. to 1500 p.s.i.a. Normally, however, the pressure in the cryogenic unit should be between 250 p.s.i.a. and 650 p.s.i.a., and preferably between 300 p.s.i.a. and 550 p.s.i.a.

The process condensate produced after shift conversion, shown in the figure as effluent from the bottom of S–1 and S–2, contains contaminants, principally dissolved $CO_2$, $H_2$ and hydrocarbons. If the condensate is discarded from the plant the contaminants may create a pollution problem. Conventionally, in order to avoid pollution, the condensate is subjected to expensive degasification treatment to remove the contaminants. I have further found that this may be avoided by vaporizing and recycling the contaminated condensate into the zone of reforming. Within the range of conditions of my improved process most of the contaminated condensate may be vaporized and so recycled, and under the preferred conditions all of the vaporized contaminated condensate may be recycled into the zone of reforming. The principal source of heat to revaporize the condensate may be the product from reforming, which has a substantial amount of heat available at a high energy level to vaporize the condensate or other water. Another source of heat may be the product from shift conversion. The revaporized contaminated condensate may, for example, be recycled to the reformer R–1 by a line or lines (not shown in the figure) to pass the revaporized condensate to the reformer (R–1) inlet steam line schematically shown in the figure. Where the preferred conditions of my process are used, and all contaminated condensate is revaporized and admitted to the zone of reforming, it is preferable to vaporize a larger part of the condensate by heat exchange with the product of reforming, and the lesser part by heat exchange with the product from shift conversion, for example, by vaporization, respectively, in the boilers B–2 and B–3 shown in the figure. This capability of eliminating pollution or the expense of such degasification treatment is a further advantage of my improved process.

I claim:

1. In the process of producing hydrogen from hydrocarbons by the steps of catalytic reforming of the hydrocarbons with steam to produce hydrogen, carbon monoxide and carbon dioxide, catalytic shift conversion with steam of the product from the aforesaid catalytic reforming to convert most of said carbon monoxide to carbon dioxide and additional hydrogen, cooling the product from the aforesaid shift conversion to condense the steam therein and separate it as condensate from the hydrogen, and removal of carbon dioxide from the hydrogen, the improvement which comprises converting in said step of catalytic reforming about 50% to about 85% of the hydrocarbons to hydrogen and oxides of carbon, by maintaining in said step of catalytic reforming a steam to carbon ratio of about 3.0 to about 7.0, a pressure of about 300 p.s.i.a. to about 700 p.s.i.a. and a temperature sufficient to give such conversion, and, after said step of removal of carbon dioxide, cryogenically separating from the hydrogen most of the unconverted hydrocarbons to give hydrogen of a high purity, said cryogenic separation being conducted substantially in the range of approximately —200° F. to approximately —310° F.

2. The improvement of claim 1 wherein the conversion of hydrocarbons to hydrogen and oxides of carbon in said step of catalytic reforming is in the range of 60% to 75%.

3. The improvement of claim 1 wherein the steam-to-carbon ratio in the said step of catalytic reforming is about 4.0, the pressure is about 500 p.s.i.a. and the conversion of hydrocarbons to hydrogen and oxides of carbon is about 65%.

4. The process of producing hydrogen from hydrocarbons which comprises catalytically reforming the hydrocarbons with steam to convert in said step about 50% to about 85% of the hydrocarbons to hydrogen, carbon monoxide and carbon dioxide, by maintaining in said step of catalytic reforming a steam to carbon ratio of about 3.0 to about 7.0, a pressure of about 300 p.s.i.a. to about 700 p.s.i.a. and a temperature sufficient to give such conversion, catalytically shift converting with steam the product from the aforesaid catalytic reforming to convert most of said carbon monoxide to carbon dioxide and additional hydrogen, cooling the product from the aforesaid shift conversion to condense the steam therein and separate it as condensate from the hydrogen, said condensate containing contaminants resulting from said process, removing carbon dioxide from the hydrogen, cryogenically separating from the hydrogen most of the unconverted hydrocarbons to give hydrogen of a high purity, said cryogenic separation being conducted substantially in the range of approximately —200° F. to approximately —310° F., and vaporizing contaminant-containing condensate and recycling it to the zone of catalytic reforming.

5. The improvement of claim 4 wherein at least a portion of said condensate is vaporized by heat exchange with the product from the step of catalytic reforming.

6. The improvement of claim 4 wherein at least a portion of said condensate is vaporized by heat exchange with the product from the step of shift conversion.

7. The improvement of claim 4 wherein there is maintained in said step of catalytic reforming a steam-to-carbon ratio of 3.5 to 6.0 and a pressure of 350 p.s.i.a. to 600 p.s.i.a. and substantially all the contaminant-containing condensate is vaporized and recycled to the zone of catalytic reforming.

(References on following page)

References Cited by the Examiner

UNITED STATES PATENTS

| | | | |
|---|---|---|---|
| 1,988,759 | 1/1935 | Svanoe | 23—212 |
| 2,051,363 | 8/1936 | Beekley | 23—212 |
| 2,064,867 | 12/1936 | Woodhouse | 23—212 |
| 2,898,288 | 8/1959 | Elliott et al. | 23—210 X |
| 3,147,080 | 9/1964 | Jahnig | 23—212 |

FOREIGN PATENTS

| | | |
|---|---|---|
| 299,588 | 11/1928 | Great Britain. |
| 439,832 | 12/1935 | Great Britain. |

OSCAR R. VERTIZ, *Primary Examiner.*

MAURICE A. BRINDISI, *Examiner.*

B. LEVENSON, *Assistant Examiner.*